(No Model.)
R. B. FITHIAN.
APPARATUS FOR TREATING SEWAGE.
No. 360,956. Patented Apr. 12, 1887.
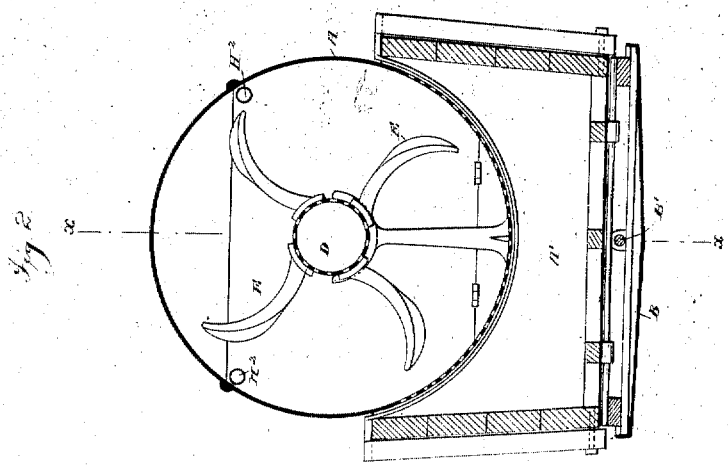
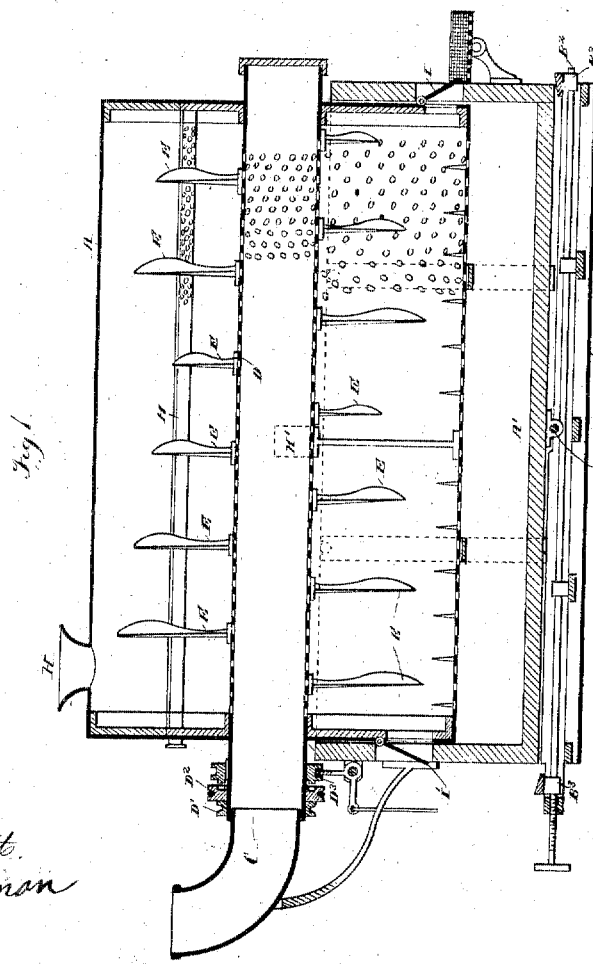

UNITED STATES PATENT OFFICE.

RICHARD BEATTY FITHIAN, OF NEW YORK, N. Y.

APPARATUS FOR TREATING SEWAGE.

SPECIFICATION forming part of Letters Patent No. 360,956, dated April 12, 1887.

Application filed July 24, 1886. Serial No. 209,000. (No model.)

*To all whom it may concern:*

Be it known that I, RICHARD BEATTY FITHIAN, a citizen of the United States, residing at the city of New York, in the county and State of New York, have invented a new and useful machine or apparatus for filtering and deodorizing water and other substances such as ordinarily pass through sewers, of which the following is a specification.

My invention relates to improvements in machines or apparatus for filtering and deodorizing the water and solid substances which are admitted into and pass through sewers, such as are used for draining towns and cities; and it further consists in a combination of devices for retaining and preparing the solid matters for use as a fertilizer. I attain these objects by the mechanism illustrated in the accompanying drawings, in which—

Figure 1 is a longitudinal section on line X X of Fig. 2, showing the combination and arrangement of the parts; Fig. 2, a transverse view showing the reservoir for the collection of the solid matter contained in the sewage, a revolving perforated pipe armed with beaters or cutters for disintegrating the earthy matter used as an absorbent, and perforated pipes for the introduction of a disinfecting or deodorizing substance.

Similar letters refer to similar parts in both of the figures.

In constructing machines of this character I provide a reservoir, A, substantially such as is shown in the accompanying drawings, or of any form that will adapt it for being connected with a sewer through which sewage-water is passed. This reservoir is, by preference, circular in form; but it may be oval or oblong, or of any other form that will admit of its being used for the purpose described, it being caused to rest upon a rectangular or otherwise-formed receptacle, A', into which the solid matter entering the machine is allowed to pass through perforations provided in the lower portion of the reservoir A. The receptacle A' rests upon any suitable platform or foundation, B, it being supported thereon by means of pivotal points B' B', so arranged that its opposite ends may be alternately raised and lowered, in order that the material contained therein may be agitated, if desired, the movements thereof being effected by means of a rod, $B^2$, which passes through the lower portion of the receptacle A' and carries upon its outer ends wedges $B^3$ $B^3$, said rod being moved longitudinally by means of a screw formed on one of its ends working in a nut attached to the receptacle, as shown in Fig. 1.

The material to be treated in this apparatus is passed into it through a pipe, C, which is fixed in its position, the material being inserted by means of a pump; or, when the location of the apparatus will admit of it, it may be caused to flow in directly from the sewer. From the pipe C the sewage passes into a perforated revolving pipe, D, which has its bearings in the ends of the reservoir A, as shown in Fig. 1, rotary motion being imparted thereto by means of pulleys D' $D^2$, placed on one end thereof, said pulleys being adapted upon their peripheries for the reception of a wire rope for driving them. In order that the pipe D may be caused to rotate or not, there is placed upon it a fixed clutch, $D^3$, which, when moved to the position in Fig. 1, will cause the pipe to rotate, and with it a series of arms or blades, E E, the effect of which will be to disintegrate any substance—such as peat or any other substance that may be placed in the apparatus to act as an absorbent—the blades or arms acting in conjunction with studs F F, pointed or otherwise, secured to the inner surface of the lower portion of the receptacle A, producing that effect. As a convenient method of inserting this absorbing material there is provided a hopper, H, which is attached to the upper surface of the reservoir A for supporting the pipe D. Bearings such as are shown at H' may be placed at proper points throughout its length. For the purpose of injecting the deodorizing or disinfecting substance when a liquid is used there is provided one or more small perforated pipes, $H^2$ $H^2$, which pass through the upper portion of the reservoir A, one of their outer ends being provided with means for attaching thereto a hose or pipe for conveying to it the liquid. It will be found, however, that when dried and powdered clay or coal ashes are mixed with the absorbing material, and especially when a small amount of sulphate of lime is added, as smaller amount of liquid disinfectant will be required, as such substances are in themselves good disinfectants.

For the purpose of enabling the solid portion of the material to be readily removed there is provided at one end of the reservoir A a valve, I, which moves in a chamber formed in the receptacle A', and opens outward in such a manner as to allow the solid portion of the material, mingled with which there is sufficient water to admit of its movement, to flow out onto a sieve or into a box having a perforated bottom, when the water is drained off and the solid portions are taken out to be used as a fertilizer. There is also a valve, I', in the opposite end of the reservoir, through which a portion of the material may be allowed to pass, if desired.

The operation of this apparatus will be as follows: The parts having been combined and arranged substantially as described, an absorbent—such as peat, coal ashes, dried and pulverized clay, or other suitable material—is passed through the hopper H, when, by revolving the hollow shaft it will be disintegrated by its blades and carried down to the bottom of the reservoir A. The sewage is then allowed to flow in through the perforated pipe D, which will distribute it over the absorbent, and it will be filtered through such material, the sewage being all allowed to pass in so as to be filtered, and at the same time the liquid disinfecting and deodorizing substance may be forced through the small pipe $H^2$, which will keep the mixed product free from emitting obnoxious odors. If the absorbing material should at any time become too dense to allow the water to filter through it with sufficient rapidity, the perforated pipe may be put in motion and the blades caused to pass through it, which will have the effect to allow the water to filter through, and when a sufficient amount has passed through it the movement of the blades is increased and the solid portions of the sewage thoroughly mixed with the absorbing material, and when thus mixed, by opening the valve I and continuing to revolve the blades, the mass will be passed out onto the sieve at the end of the reservoir, from whence it is taken for use, the discharge being hastened on account of the fact that the blades are arranged spirally upon the shaft, and it may be still further hastened by so adjusting the wedges as to incline the reservoir toward the valve I. The water filtering through the bottom of the reservoir A falls on a bed of absorbent material placed in the lower portion of the receptacle A', from which it may be drawn off in any convenient manner, it having been thoroughly deodorized and purified.

Having thus described my invention, what I claim, and desire to secure by Letters Patent, is—

1. In an apparatus for deodorizing, purifying, and collecting for use the solid portions of sewage, the combination of a reservoir, A, for the reception of the sewage, having a perforated bottom, a rotating perforated pipe, D, through which the sewage passes, a receptacle, A', arranged below the pipe for the reception of absorbing and dry deodorizing material, and perforated pipes $H^2$, for the introduction of liquid deodorizing and disinfecting material, the parts being arranged for operation substantially in the manner described.

2. The combination of the reservoir A, having a perforated lower surface supplied with projecting pins or stubs, the spirally-arranged blades F F, the tilting receptacle A', having in its lower portion a chamber for the reception of an absorbent material, and a sieve or box having a perforated bottom the opening to which is controlled by a valve for the regulation of the flow of the material from the reservoir to said sieve or box, all substantially as set forth.

3. In an apparatus for treating sewage, the combination of the tilting receptacle A', the reservoir A, an induction-pipe perforated in such a manner as to allow the sewage to pass through it, a receiving sieve or box having a perforated bottom, and suitable mechanism for rotating the pipe and for tilting the receptacle, substantially in the manner shown and described.

RICHARD BEATTY FITHIAN.

Witnesses:
JOHN WIECHMAN,
HENRY FICKEN.

It is hereby certified that in Letters Patent No. 360,956, granted April 12, 1887, upon the application of Richard Beatty Fithion, of New York, New York, for an improvement in "Apparatus for Treating Sewage," errors appear in the printed specification requiring the following corrections: In line 88, page 1, a comma should be substituted for the period after the reference letter "D." and the following word "Bearing" should commence with a small *b* making a continuous sentence; in line 101, same page, the words "as maller" should read *a smaller*; and that said Letters Patent should be read with these corrections therein that the same may conform to the record of the case in the Patent Office.

Signed, countersigned, and sealed this 26th day of April, A. D. 1887.

[SEAL.]

D. L. HAWKINS,
*Acting Secretary of the Interior.*

Countersigned:
BENTON J. HALL,
*Commissioner of Patents.*